Figure 1:
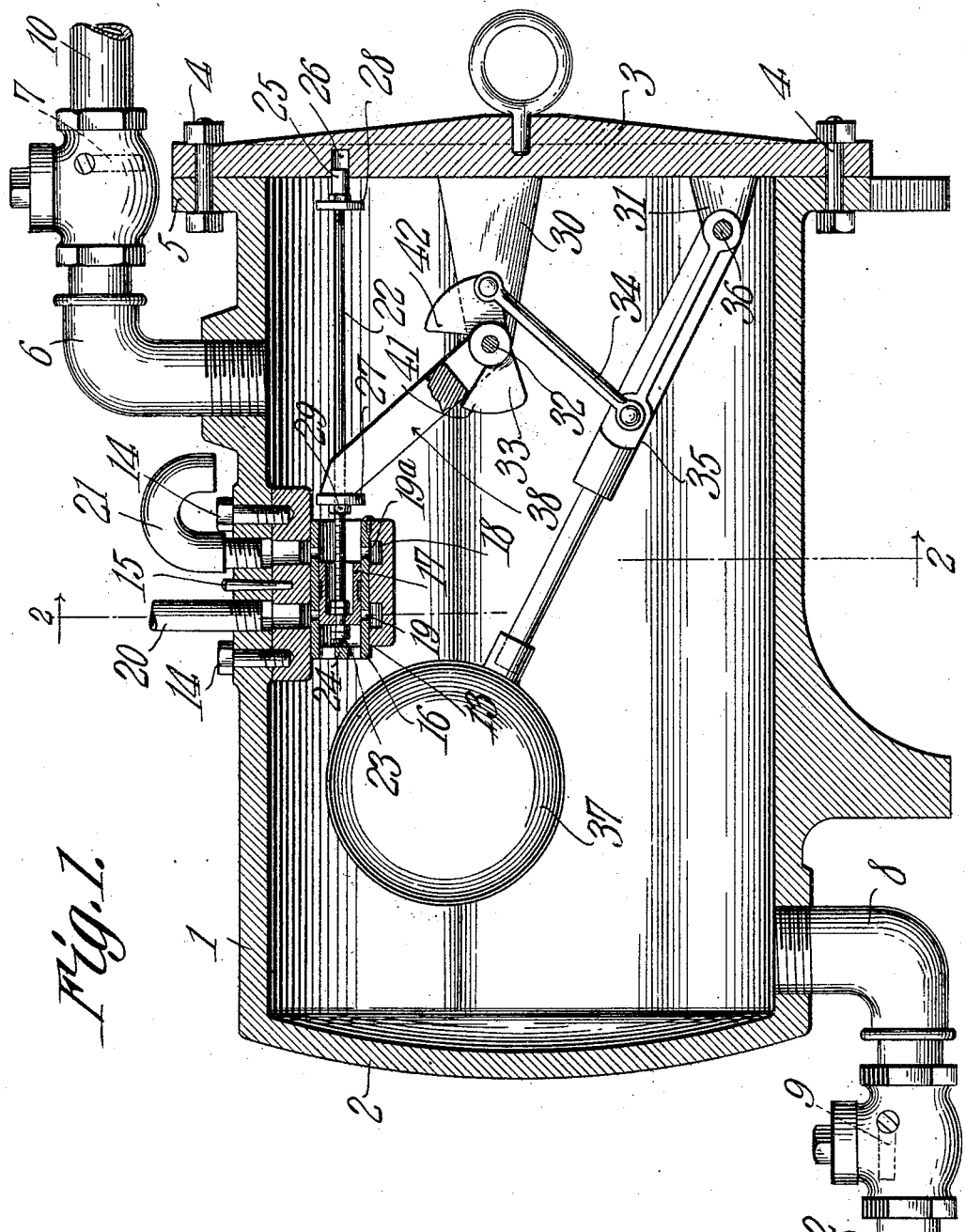

O. WINTER.
VACUUM TRAP.
APPLICATION FILED AUG. 26, 1907.

955,374.

Patented Apr. 19, 1910.

2 SHEETS—SHEET 1.

Witnesses:

Inventor,
Oscar Winter.
By C. A. Snow & Co.
Attorneys.

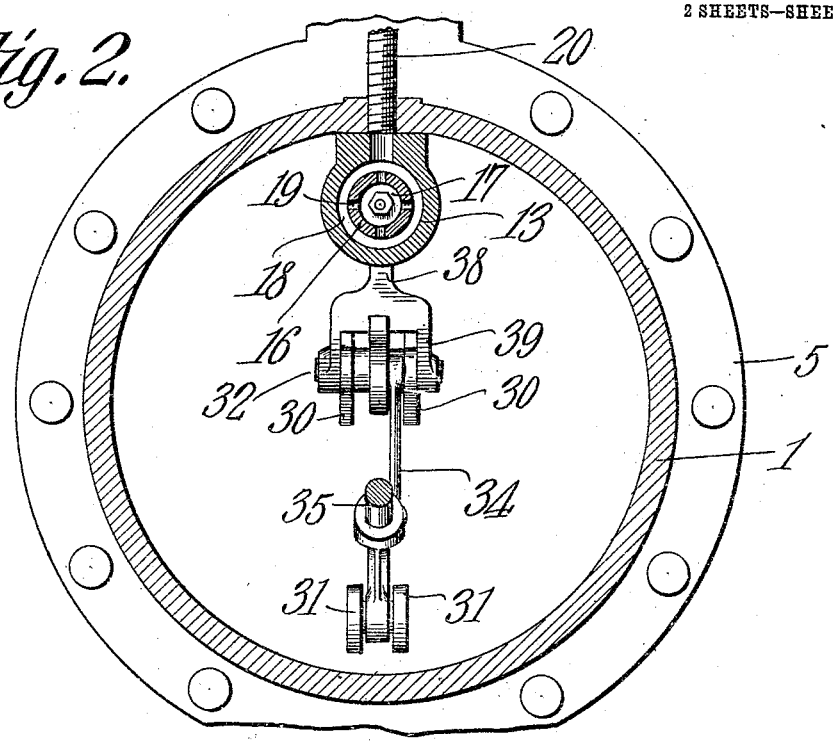
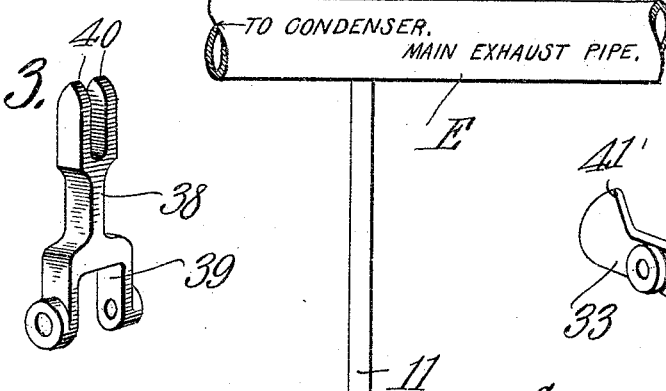
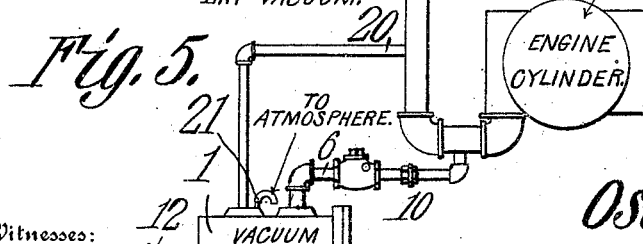

UNITED STATES PATENT OFFICE.

OSCAR WINTER, OF CLEVELAND, OHIO, ASSIGNOR, BY MESNE ASSIGNMENTS, TO THE CLARK MANUFACTURING COMPANY, OF CLEVELAND, OHIO, A CORPORATION OF OHIO.

VACUUM-TRAP.

955,374.  Specification of Letters Patent.  Patented Apr. 19, 1910.

Application filed August 26, 1907. Serial No. 390,230.

*To all whom it may concern:*

Be it known that I, OSCAR WINTER, a citizen of the United States, residing at Cleveland, in the county of Cuyahoga and State of Ohio, have invented a new and useful Vacuum-Trap, of which the following is a specification.

This invention relates to vacuum traps.

The object of the invention is to provide a simple and thoroughly efficient apparatus of this character by which water can be eliminated from exhaust pipes, engine cylinders, steam appliances and the like under a vacuum, which shall be automatic in action, which will not be liable to become deranged from long continued use, and in which the bulk of the oil used for internal lubrication may be recovered.

With the above and other objects in view, as will appear as the nature of the invention is better understood, the same consists in the novel construction and combination of parts of a vacuum trap as will be hereinafter fully described and claimed.

In the accompanying drawings forming a part of this specification and in which like characters of reference indicate corresponding parts,—Figure 1 is a view in vertical longitudinal section through a vacuum trap constructed in accordance with the present invention. Fig. 2 is a view in vertical transverse section, taken on the line 2—2 of Fig. 1 and looking in the direction of the arrow thereon. Fig. 3 is a perspective detail view of the hammer or unstable equilibrium device that is employed for actuating the valve of the apparatus. Fig. 4 is a perspective detail view of a rocker that is employed for actuating the hammer. Fig. 5 is a diagrammatic view showing the connection between an engine cylinder, the vacuum trap, and the main exhaust pipe to the condenser.

The apparatus comprises a trap 1, which is a cylindrical metallic body, and is herein shown as having an integral head 2 and a removable head 3, the latter being held in position by bolts 4 that pass through a flange 5 formed on the trap. This form of trap will be found efficient for the purpose designed, but it is to be understood that its construction may be varied to meet emergencies that might arise in applying the apparatus to use, without departing from the spirit of the invention.

Connecting with the upper side of the trap is a pipe 6 that carries an inlet valve 7 of the swinging type, which swings toward the trap, and connected with the lower portion of the trap is a pipe 8 that carries an outlet valve 9 that swings away from the trap. An extension 10 of the pipe 6 will connect with the exhaust pipe 11 that communicates with the engine cylinder C as shown in Fig. 5, the upper end of the pipe 11 being tapped into the main exhaust pipe E. An extension 12 of the pipe 8 may lead to a suitable source of discharge, or if preferred may enter a depurating tank where the bulk of the oil or other lubricant used for internal lubrication may be conserved.

Arranged on the interior of the trap and preferably at its upper portion, is a valve chamber 13 that is held in place by four bolts 14 (two only being shown), a tapered pin 15 extending through the shell of the trap and into the chamber serving, in conjunction with the bolts, to maintain the chamber in operative position. Disposed within the chamber is a bushing 16, preferably of bronze metal, in which is arranged a piston valve 17. The valve chamber is provided with internal ports 18 that communicate with two sets of radial ports 19 and 19ª in the bushing. The ports 18 are in communication with pipes 20 and 21, the former of which communicates with the exhaust pipe 11, as shown in Fig. 2, and the latter of which communicates with the atmosphere and is in the form of an elbow joint, the opening of which is downward to preclude entrance of dust and the like to the interior of the trap.

The piston valve has connected with it one end of a piston rod 22, which projects through the head of the piston valve and is held firmly assembled therewith by pairs of nuts 23 disposed on opposite sides thereof, there being a slight clearance left between the inner pair of nuts and the head of the piston valve to prevent the latter from sticking should the stem be out of alinement. The head 24 of the bushing, which, as shown in Fig. 1, is an openwork structure, serves to limit the movement of the piston rod in one direction, movement in the other direction being limited by a socket nut 25 that is screwed on the piston rod and works in a socket 26 formed in the trap head 3. The piston rod further carries two adjustable disks 27 and 28 that constitutes abutments, and are held against longitudinal movement on the piston rods by a nut 29 and the socket nut 25.

Carried by the head 3 are two pairs of inward-projecting arms or brackets 30 and 31, the former being disposed approximately at the center of the head and the latter near the lower portion thereof. The arms 30 support a shaft 32 upon which is loosely mounted a rocker 33 with which connects one end of a link 34, the other end of which is pivotally connected with a lever 35 fulcrumed upon a shaft 36 between the arms 31. The outer end of the lever carries a ball float 37, of the usual or any preferred construction, and which as will be obvious, will be positive in imparting rocking movements to the lever when the levels of water in the trap vary. Mounted for rocking movements on the shaft 32 is a hammer or unstable equilibrium device 38 which is provided with a yoke 39 that straddles the rocker and engages the shaft. The upper end of the hammer is formed with a head bifurcated to provide two arms 40 that straddle the piston rod, as clearly shown in Fig. 1.

The rocker is provided with two toes 41 and 42 that are adapted to engage with opposite sides of the yoke and thus effect its shifting, in a manner that will presently appear.

All of the parts thus far described are to be made of metals that will be capable of withstanding corrosive action, so that efficiency in operation will at all times be secured.

The operation of the apparatus is as follows: Let it be assumed that the parts are in the position shown in Fig. 1, which will be true when the trap contains the maximum volume of water and when the hammer has just acted and shifted the valve 17 to the position shown in Fig. 1. It will be seen that the ports 19 that communicate with the vacuum pipe 20 are closed and that the ports 19ª that communicate with the air pipe are open. The instant that the parts assume the position shown air rushes in and destroys the vacuum in the trap and holds the inlet valve 7 to its seat, while the outlet valve 9 opens by gravity and permits the accumulated water to escape. As soon as the ball valve begins to lower by the falling of the water level, the toe 41 of the rocker will be moved to the right and by contact with the yoke of the hammer will shift it in the same direction. When the hammer passes the dead center it falls to the right and strikes the disk 28 a blow the force of which shifts the piston rod and causes the valve to close the ports 19ª and open the ports 19, whereupon a vacuum is once more established and maintained until the condensed water reaches such level as to cause the toe 42 to move to the left and thus shift the hammer to cause it to fall in the same direction and contact with the disk 27 and thereby shift the piston rod to close the ports 19 and open the ports 19ª, whereupon the vacuum will be destroyed and the trap again emptied of water.

It will be seen from the foregoing description although the improvements herein defined are simple in character they will be found thoroughly efficient for the purposes designed and will result in the production of highly reliable, durable and automatically operating apparatus.

What is claimed is:—

1. In apparatus of the class described, a valve chamber having ports, a piston valve therein for controlling passage through the ports, a piston rod connected with said valve and carrying abutments, a hammer having its lower end pivoted below said piston rod and its upper end arranged to engage such abutments to effect shifting of said valve, a rocker to actuate said hammer, and a ball float pivoted for movement about an axis independent of that of said hammer and operatively connected with said rocker.

2. In a trap, the combination of a valve casing having ports, a valve for controlling passage through said ports, a substantially horizontal reciprocable rod connected with said valve and carrying spaced abutments, a hammer pivoted on an axis lying below said rod, said hammer being adapted to swing freely in either direction from a vertical position to engage the abutments on said rod, respectively, and thereby correspondingly to actuate said valve, and means responsive to the level of water in the trap adapted to raise said hammer from either position of engagement to such vertical position.

3. In a trap, the combination of a valve casing having ports, a valve for controlling passage through said ports, a substantially horizontal reciprocable rod connected with said valve and carrying spaced abutments, a hammer pivoted on an axis lying below said rod, the head of said hammer forming the outer end and said hammer being adapted to swing freely in either direction from a vertical position to strike a direct blow with such head upon the abutments on said rod, respectively, and thereby correspondingly to actuate said valve, and means responsive to the level of water in the trap adapted to raise said hammer from either position of engagement to such vertical position.

4. In a trap, the combination of a valve casing having ports, a valve for controlling passage through said ports, a substantially horizontal reciprocable rod connected with said valve and carrying spaced abutments, a hammer pivoted on an axis lying below said rod, said hammer having its outer end in the form of a bifurcated head straddling said rod and being adapted to swing freely in either direction from a vertical position to strike a direct blow with such head upon the abutments on said rod, respectively, a rocker pivoted on the same axis as said hammer and having toes adapted alternately to engage said hammer to raise the same from either position of engagement to such vertical position, and means responsive to the level of water in the trap adapted to actuate said rocker, said means being pivoted on an axis other than the common axis of said hammer and rocker.

5. In apparatus of the class described, a valve casing having ports, a valve for controlling passage through such ports, a rod connected with said valve and carrying spaced abutments, a pivoted hammer having its head disposed alternately to strike against such abutments, a rocker unconnected with said hammer but having toes adapted alternately to be brought into engagement therewith, and float means for actuating said rocker, said means being pivoted on an axis other than that of said hammer or said rocker.

6. In apparatus of the class described, a valve casing having ports, a valve for controlling passage through such ports, a rod connected with said valve and carrying spaced abutments, a hammer pivoted below said rod and provided at its upper end with a bifurcated head straddling said rod and disposed to engage such abutments alternately, a rocker unconnected with said hammer but having toes adapted alternately to be brought into engagement therewith, and a float lever pivoted on an axis other than that of said hammer or said rocker but connected with said rocker.

7. In apparatus of the class described, a valve casing having ports, a valve for controlling passage through such ports, a rod connected with said valve and carrying spaced abutments, a hammer pivoted below said rod and provided at its upper end with a bifurcated head straddling said rod and disposed to engage such abutments alternately, a rocker unconnected with said hammer but having toes adapted alternately to be brought into engagement therewith, a float lever pivoted on an axis other than that of said hammer or of said rocker, and a link connecting said lever with said rocker.

8. In a trap, the combination of a valve casing having ports, a valve for controlling passage through said ports, a substantially horizontal reciprocable rod connected with said valve and carrying spaced abutments, a hammer pivoted on an axis lying below said rod, said hammer having its outer end in the form of a bifurcated head straddling said rod and being adapted to swing freely in either direction from a vertical position to strike a direct blow with such head upon the abutments on said rod, respectively, a rocker pivoted on the same axis as said hammer and having toes adapted alternately to engage said hammer to raise the same from either position of engagement to such vertical position, a float lever pivoted on an axis other than that of said hammer and said rocker, and a link connecting said lever with said rocker.

9. A trap having one of its heads provided with a socket, a valve chamber arranged within the trap and having ports, a piston valve arranged within the chamber for controlling passage through such ports, a horizontally extending piston rod connected at one end with said valve and having its other end disposed within such socket, abutments carried by said piston rod, a hammer pivoted below said rod and arranged to engage such abutments to effect shifting of the valve, a rocker adapted to actuate said hammer, and a ball float pivoted for movement independently of said hammer and operatively connected with said rocker.

In testimony that I claim the foregoing as my own, I have hereto affixed my signature in the presence of two witnesses.

OSCAR WINTER.

Witnesses:
R. C. LINDER,
H. C. POWERS.